(12) United States Patent
Boddy (10) Patent No.: US 7,549,941 B2
(45) Date of Patent: Jun. 23, 2009

(54) VEHICLE DIFFERENTIAL INCLUDING PUMP WITH VARIABLE-ENGAGEMENT CLUTCH

(75) Inventor: Douglas E. Boddy, Orion, MI (US)

(73) Assignee: Eaton Corporation, Cleveland, OH (US)

( * ) Notice: Subject to any disclaimer, the term of this patent is extended or adjusted under 35 U.S.C. 154(b) by 407 days.

(21) Appl. No.: 11/412,764

(22) Filed: Apr. 27, 2006

(65) Prior Publication Data
US 2007/0060436 A1 Mar. 15, 2007

Related U.S. Application Data

(63) Continuation-in-part of application No. 11/223,568, filed on Sep. 9, 2005, now Pat. No. 7,361,114.

(51) Int. Cl.
*F16H 48/20* (2006.01)

(52) U.S. Cl. ............... 475/231; 475/249; 192/48.4; 192/48.8; 192/49; 192/87.12; 192/87.13

(58) Field of Classification Search ............... 475/223, 475/230, 231, 249; 192/48.3, 48.4, 48.8, 192/49, 21.5, 103 F, 87.12, 87.13; 74/730.1, 74/732.1
See application file for complete search history.

(56) References Cited

U.S. PATENT DOCUMENTS

| | | | |
|---|---|---|---|
| 4,503,297 A | 3/1985 | Yagi et al. | |
| 4,803,628 A | 2/1989 | Hayashi et al. | |
| 4,981,190 A | 1/1991 | Nakayama et al. | |
| 5,033,329 A | 7/1991 | Tezuka | |
| 5,137,128 A | 8/1992 | Takei et al. | |
| 5,152,362 A | 10/1992 | Naito | |
| 5,208,755 A | 5/1993 | Tezuka | |
| 5,408,411 A | 4/1995 | Nakamura et al. | |
| 5,468,058 A | 11/1995 | Linkner, Jr. | |
| 5,752,575 A | 5/1998 | Konishi et al. | |
| 6,209,676 B1 | 4/2001 | Jones et al. | |
| 6,318,532 B1 * | 11/2001 | Gassmann | 192/35 |
| 6,412,618 B1 | 7/2002 | Stretch et al. | |
| 6,422,367 B1 | 7/2002 | Reuschel et al. | |
| 6,564,139 B2 | 5/2003 | Sakakiyama | |
| 6,594,573 B1 | 7/2003 | Rossmann et al. | |
| 6,634,344 B2 | 10/2003 | Stretch | |
| 6,645,108 B1 | 11/2003 | Gradu | |

(Continued)

FOREIGN PATENT DOCUMENTS

JP 02286432 11/1990

(Continued)

*Primary Examiner*—David D. Le
(74) *Attorney, Agent, or Firm*—Dykema Gossett PLLC (57) ABSTRACT

A vehicle differential assembly is provided that includes a differential adapted to allow differing rotational speed between a pair of outputs. The differential includes a gear assembly connected to the outputs and one or more hydraulically-actuated clutches for selectively and variably coupling the outputs. A hydraulic pump is adapted to generate hydraulic fluid pressure for engagement of the hydraulically-actuated clutches. A variable-engagement clutch is operatively connected to the input and the hydraulic pump such that the input selectively drives the hydraulic pump during engagement of the clutch to provide hydraulic fluid pressure to the hydraulically-actuated clutches. A valve operatively connected to the hydraulic pump and the hydraulically-actuated clutches selectively and variably provides fluid pressure from the hydraulic pump to the hydraulically-actuated clutches.

15 Claims, 12 Drawing Sheets

U.S. PATENT DOCUMENTS

| | | |
|---|---|---|
| 6,712,728 B2 | 3/2004 | Gradu |
| 6,712,730 B2 | 3/2004 | Gradu |
| 6,755,702 B2 | 6/2004 | Mele |
| 6,755,762 B2 | 6/2004 | Gradu |
| 6,778,883 B1 | 8/2004 | Gerhardt et al. |
| 6,862,511 B1 | 3/2005 | Phillips et al. |
| 6,907,337 B2 | 6/2005 | Phillips et al. |
| 6,909,959 B2 | 6/2005 | Hallowell |
| 6,915,198 B2 | 7/2005 | Phillips et al. |
| 6,962,227 B1 | 11/2005 | Kirkwood |
| 7,077,256 B2 * | 7/2006 | Gratzer et al. ........... 192/103 F |
| 7,210,566 B2 * | 5/2007 | Baxter, Jr. .................... 192/35 |
| 2003/0079727 A1 | 5/2003 | Stretch |
| 2003/0098185 A1 | 5/2003 | Komeda et al. |
| 2003/0163296 A1 | 8/2003 | Richards |
| 2003/0173179 A1* | 9/2003 | Gratzer ..................... 192/3.57 |
| 2004/0249533 A1 | 12/2004 | Wheals et al. |
| 2005/0070391 A1 | 3/2005 | Folsom et al. |
| 2005/0159264 A1 | 7/2005 | Puiu et al. |
| 2005/0176543 A1 | 8/2005 | Kirkwood et al. |
| 2005/0252707 A1 | 11/2005 | Bowen |
| 2005/0261098 A1 | 11/2005 | Bowen |
| 2005/0261099 A1 | 11/2005 | Bowen |
| 2005/0266950 A1 | 12/2005 | Bowen |
| 2005/0266952 A1 | 12/2005 | Puiu |
| 2005/0266953 A1 | 12/2005 | Puiu |

FOREIGN PATENT DOCUMENTS

| | | |
|---|---|---|
| JP | 04232125 A2 | 8/1992 |
| JP | 05208623 | 8/1993 |
| JP | 05238281 | 9/1993 |
| WO | WO 02079661 A1 * | 10/2002 |
| WO | WO02/101346 A1 | 12/2002 |

* cited by examiner

VEHICLE DIFFERENTIAL INCLUDING PUMP WITH VARIABLE-ENGAGEMENT CLUTCH

RELATED APPLICATION DATA

The present application is a continuation-in-part of U.S. application Ser. No. 11/223,568, which was filed on Sep. 9, 2005.

FIELD OF THE INVENTION

The present invention relates to a vehicle differential and to a vehicle differential including a hydraulic pump with a variable-engagement clutch.

DESCRIPTION OF THE RELATED ART

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Recently, an electronically-controlled, limited-slip differential has been introduced that includes a hydraulically-actuated clutch to limit differential rotation between output shafts of the differential. The hydraulically-actuated clutch is powered by a pump connected to a vehicle drive shaft. Most of the time, the vehicle has adequate traction negating the need to actuate the hydraulic clutch. However, provided the drive shaft is rotating, the pump is still operating and pumping fluid. In this arrangement, the differential requires one or more valves to distribute pressurized fluid to the hydraulically-actuated clutch when needed. The parasitic energy losses generated by the continually operating pump can negatively impact vehicle fuel economy and shorten the useful life of the hydraulic fluid. For at least these reasons, an improved differential is desired.

SUMMARY OF THE INVENTION

A vehicle differential assembly is provided that includes a differential driven by an input and adapted to allow differing rotational speed between a pair of outputs. The differential includes a gear assembly connected to the outputs and one or more hydraulically-actuated clutches for selectively and variably coupling the outputs. A hydraulic pump is adapted to generate hydraulic fluid pressure for engagement of the one or more hydraulically-actuated clutches. A variable-engagement clutch is operatively connected to the input and the hydraulic pump such that the input can selectively drive the hydraulic pump during engagement of the clutch to provide hydraulic fluid pressure to the one or more hydraulically-actuated clutches. A valve is operatively connected to the hydraulic pump and the one or more hydraulically-actuated clutches to selectively or variably provide fluid pressure from the hydraulic pump to the one or more hydraulically-actuated clutches. Other aspects of the invention will be apparent to those skilled in the art after review of the drawings and detailed description provided below. A method of controlling the stability of a vehicle is also provided.

BRIEF DESCRIPTION OF THE DRAWINGS

Embodiments of the invention will now be described, by way of example, with reference to the accompanying drawings, wherein.

DETAILED DESCRIPTION

Referring now to the drawings, several embodiments of the present invention are shown. The drawings are not necessarily to scale and certain features may be simplified or exaggerated to better illustrate and explain the present invention. Further, the embodiments set forth herein are not intended to be exhaustive or otherwise limit or restrict the invention to the precise configurations shown in the drawings and disclosed in the following detailed description.

Figure 1:
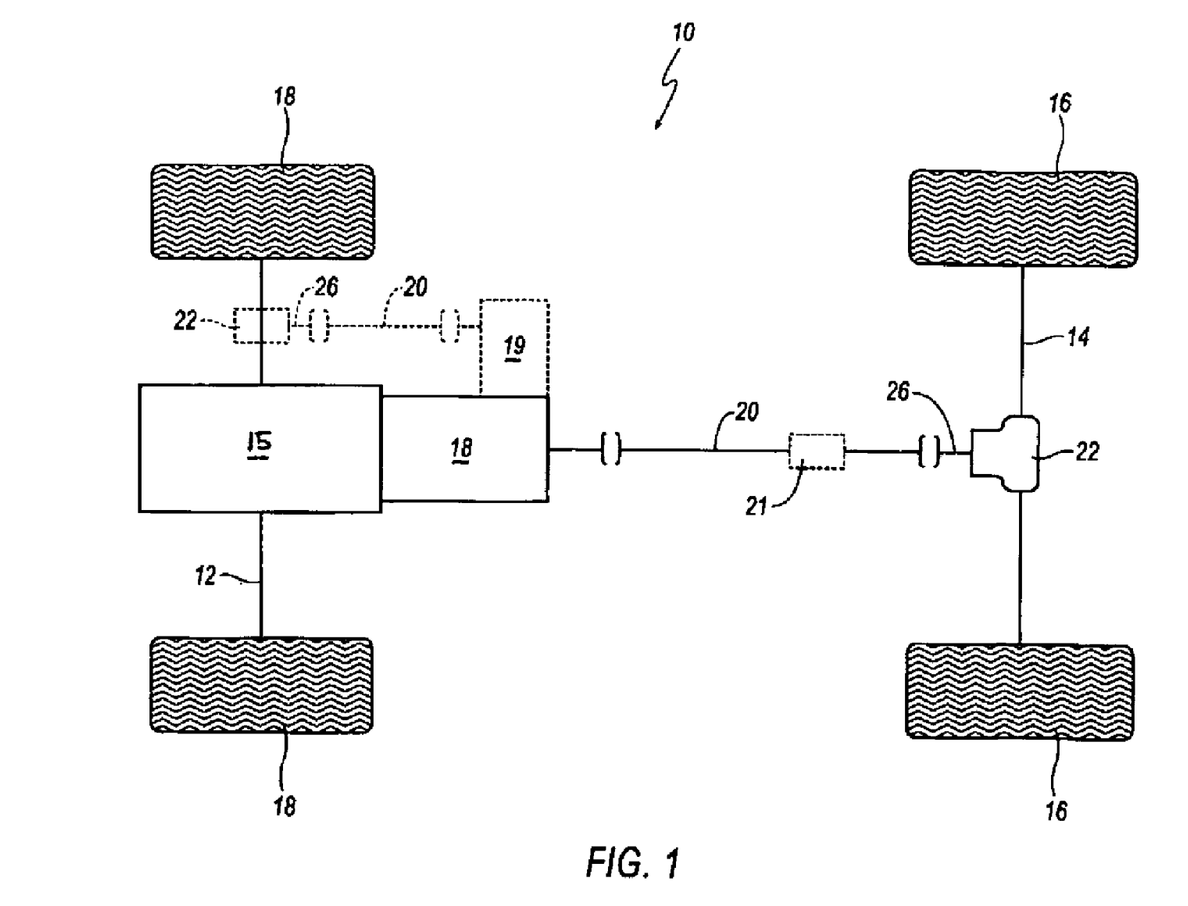
FIG. 1 is a schematic illustration of a vehicle powertrain system including a differential assembly and torque coupling according to embodiments of the present invention.

Referring to FIG. 1, an exemplary automotive vehicle 10, such as a passenger car, sport utility vehicle or light truck, is shown that includes first and second vehicle axles 12 and 14, respectively, a prime mover 15, such as an internal combustion engine, and a power transmission mechanism 18. In the illustrated embodiment, second axle 14 serves as the primary vehicle-propelling drive axle to which primary drive wheels 16 are operatively connected. In contrast, first axle 12 serves as a secondary axle to which a steering wheel may be connected. Optionally, first axle 12 may also function as a vehicle-propelling drive axle adapted to receive torque from a transfer case 19 (shown in phantom in FIG. 1) that apportions torque between primary and secondary drive axles 14, 12. Torque may be transmitted to axles 12 and 14 through one or more prop- or drive-shafts 20, an optional torque coupling 21 according to an embodiment of the present invention, and a differential assembly 22 according to an embodiment of the present invention. Vehicle 10 shown in FIG. 1 is provided by way of example only and may include other powertrain arrangements, such as, for example, a primary front drive arrangement in which first axle 12 serves as the primary drive axle.

Figure 2:
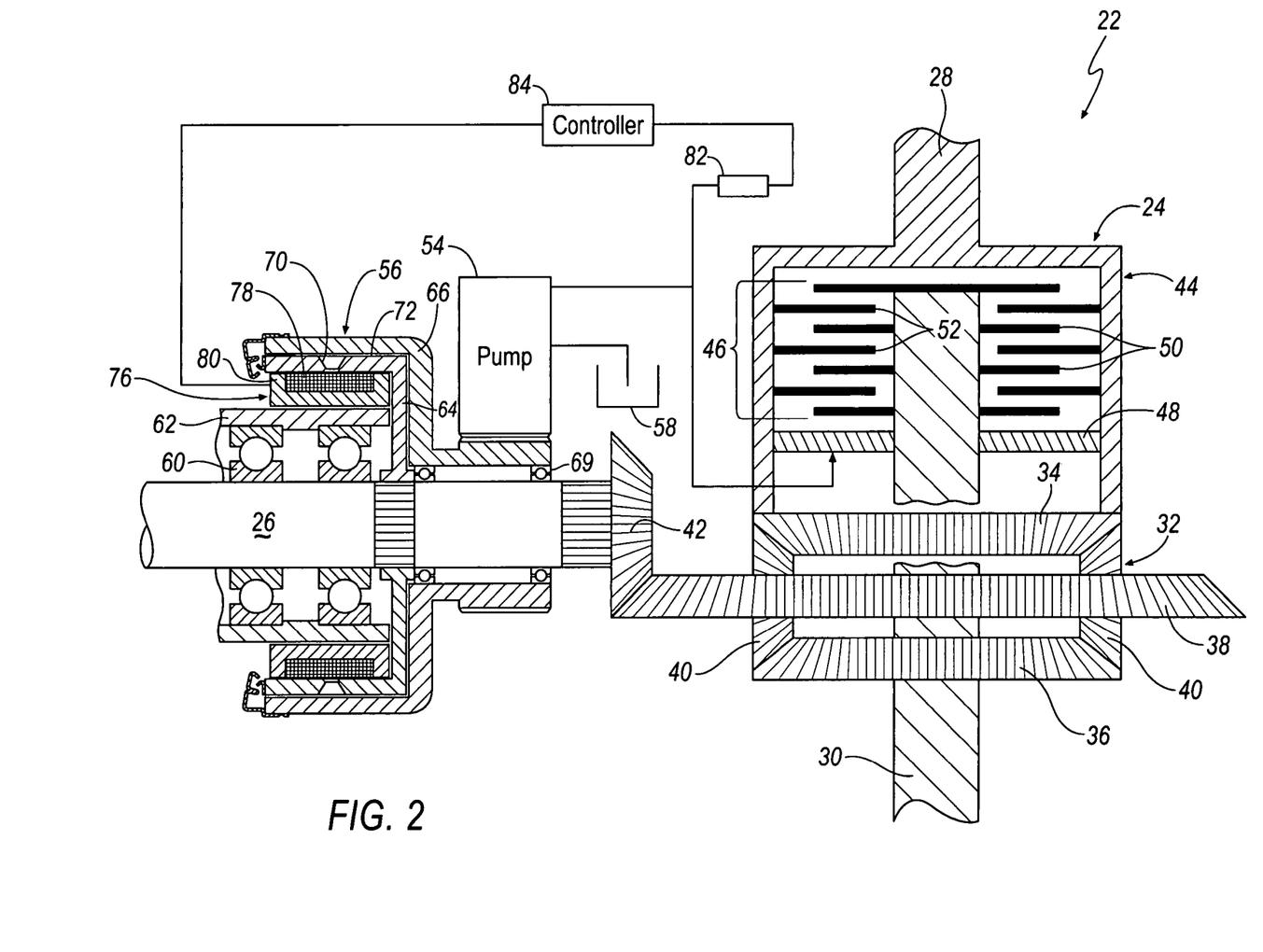
FIG. 2 is a schematic illustration of a differential assembly according to an embodiment of the present invention.
Figure 3:
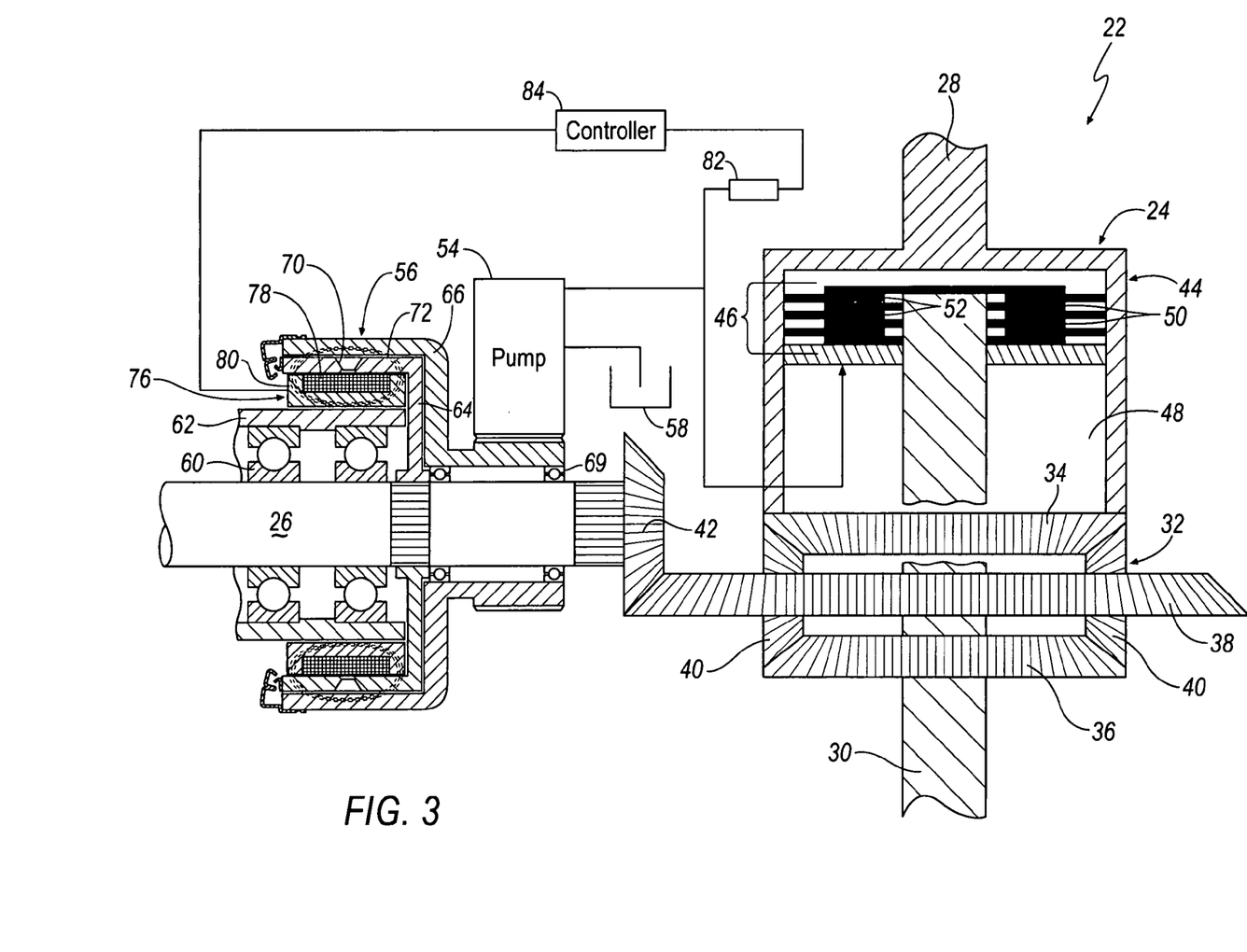
FIG. 3 is a schematic illustration of the differential assembly of FIG. 2 shown during engagement of a variable-engagement clutch and a hydraulically-actuated clutch.

Referring to FIGS. 2 and 3, an embodiment of differential assembly 22 is shown. In the illustrated embodiment, differential assembly 22 is a hydraulically-assisted, electronically-controlled, limited-slip differential that is capable of providing variable torque distribution between a pair of outputs 28 and 30, which, if desired, can range up to full axle lock.

Differential 22 may be used as a stand-alone product or, instead, if desired, may be integrated with another vehicle system, such as a vehicle's antilock brake system (ABS) or stability control package, to provide enhanced vehicle dynamics.

As shown in FIG. 2, differential assembly 22 includes a differential 24 that is driven by an input 26 and adapted to allow differing rotational speed between outputs 28, 30. A gear assembly 32, which may include a pair of side gears 34 and 36, is connected to a corresponding one of outputs 28, 30. A ring gear 38 may include a pair of pinion gears 40 that, for example, may mesh with side gears 34, 36. Input 26 includes a rotatable pinion shaft having a pinion gear 42 the meshes with ring gear 38.

A hydraulically-actuated clutch 44 selectively and variably couples outputs 28, 30 when torque transfer therebetween is desired. In the illustrated embodiment, hydraulically-actuated clutch 44, which is shown schematically for illustration, includes a multi-disk clutch pack 46 and a clutch pack-compressing actuator 48 (e.g., a piston) that is movable in response to application of hydraulic fluid pressure. At least one first friction disk 50 is connected for rotation with output 30 and at least one second friction disk 52 is connected for rotation with output 28. The embodiment of hydraulically-actuated clutch 44 generically shown in FIGS. 2 and 3 is provided by way of reference only and it will be appreciated that other fluid power assisted clutch configurations that selectively and variably couple outputs 28, 30 may be employed in differential assembly without departing from the scope of the present invention. For example, hydraulically-actuated clutch 44 may comprise any type of axially actuated clutch, such as a single disk clutch, a multi-disk clutch or a cone clutch. A square jaw clutch or a spiral jaw clutch may also be used; however, these clutches do not necessarily proportionally transmit torque.

Differential assembly 22 also includes a hydraulic pump 54 adapted to generate hydraulic fluid pressure for engagement of hydraulically-actuated clutch 44. In an embodiment, hydraulic pump 54 is a gerotor pump driven by a variable-engagement clutch 56 operatively connected to input 26 such that input 26 selectively and variably drives hydraulic pump 54 during engagement of variable-engagement clutch 56. To minimize parasitic losses associated with operation of hydraulic pump 54 when pressurized fluid is not needed, variable-engagement clutch 56 may be operated only when fluid power is required by hydraulically-actuated clutch 44 and the level of engagement is tailored to the degree of engagement desired in hydraulically-actuated clutch 44. In this manner, the valves and other apparatus required to distribute fluid power in various conventional electronically-controlled, limited-slip differentials may be eliminated. A housing (not shown) may surround differential 24, hydraulic pump 54, and variable-engagement clutch 56, and may include a sump 58 from which hydraulic pump 54 draws hydraulic fluid for pressurization and transfer to hydraulically-actuated clutch 44.

In an embodiment, variable-engagement clutch 56 may be a magnetic particle clutch that transmits torque between input 26 and hydraulic pump 54 in proportion to the electric current supplied to it. While variable-engagement clutch 56 is generally described herein as a magnetic particle clutch, other types of variable-engagement clutches, such as clutches that employ electro-restrictive media to transmit torque between two relatively rotating members, may also be used in differential assembly 22 without departing from the scope of the present invention.

Figure 4:
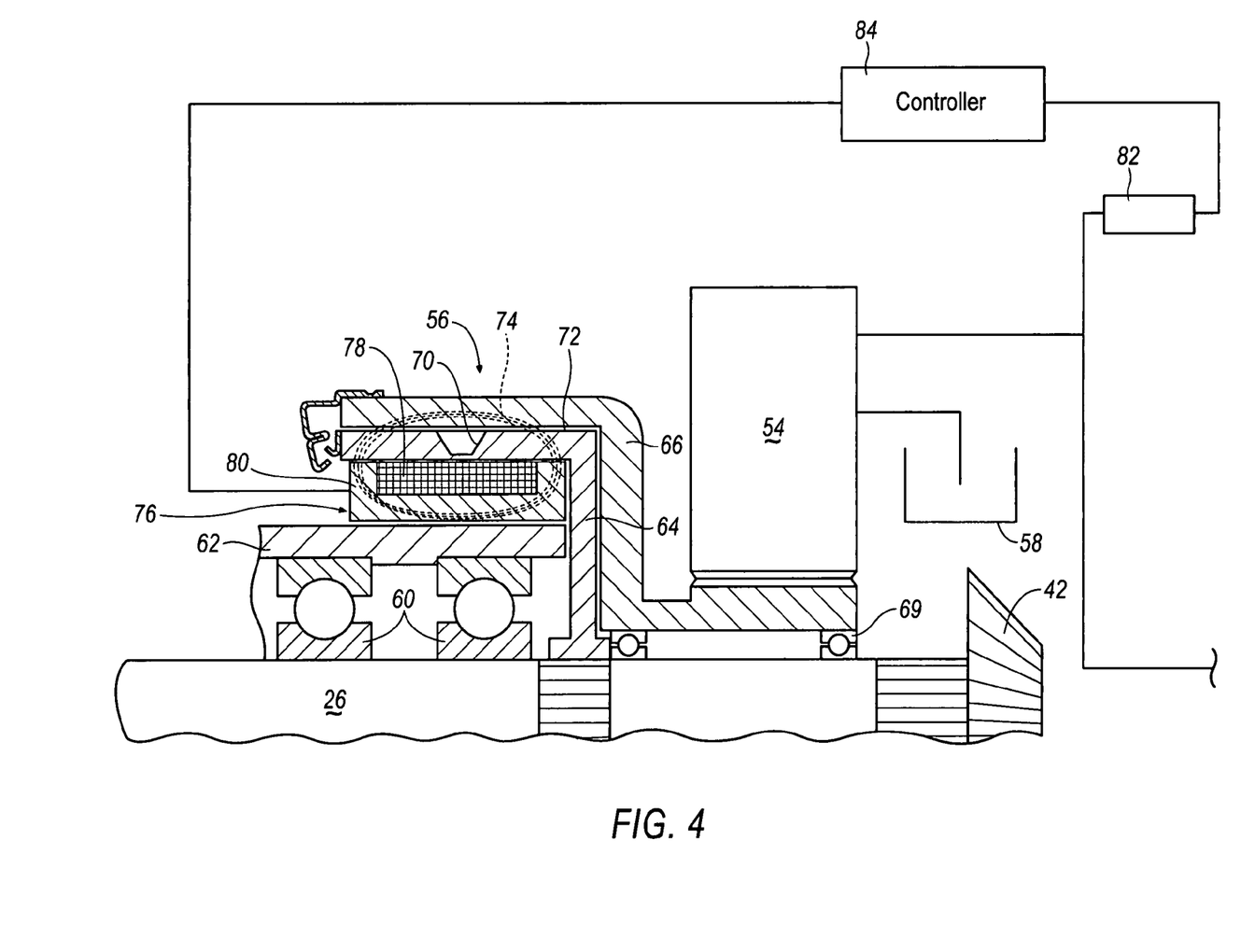
FIG. 4 is an enlarged view cross-sectional view of the variable-engagement clutch shown in FIGS. 2 and 3.

In the illustrated configuration, variable-engagement clutch 56 is supported on input 26 by bearings 60 that may be positioned within a generally cylindrical support 62 that can be attached to the housing surrounding differential 24, hydraulic pump 54 and variable-engagement clutch 56. As generally shown in FIG. 4, a rotatable and generally cylindrical input member 64 may be operatively connected to input 26, a rotatable and generally cylindrical output member 66 is operatively connected to hydraulic pump 54. A medium 68 (such as a rheological medium; see, e.g., FIGS. 5A and 5B) is disposed between input and output members 64, 66. In the illustrated embodiment, input and output members 64, 66 are splined to input 26 and hydraulic pump 54, respectively. Any number of other bearings, such as bearings 69, may be used to facilitate rotation of input and output members 64, 66 relative to input 26 and/or the differential assembly housing.

Input and output members 64, 66 generally exhibit magnetic properties, but may include at least one generally non-magnetic feature 70. As will be described in further detail below, magnetic flux will follow a path of least resistance (i.e., a path of highest magnetic permeance). Non-magnetic features 70 make the path through medium 68 and output member 66 an easier magnetic path (with higher magnetic permeance) than the short circuit through input member 64.

Figure 6:
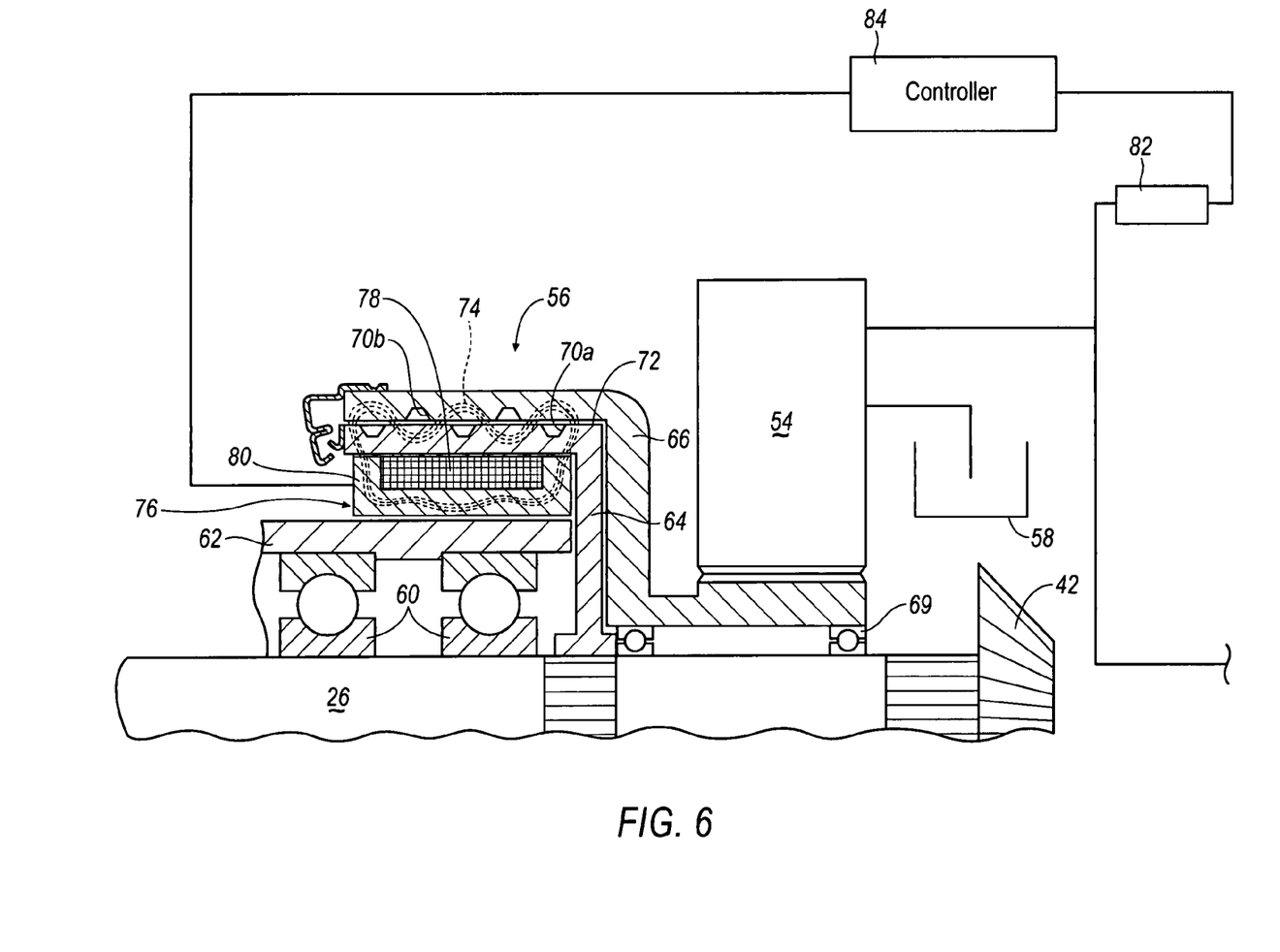
FIG. 6 is a cross-sectional view of a variable-engagement clutch according to another embodiment of the present invention.

Referring to an embodiment shown in FIG. 4, non-magnetic feature 70 may comprise a groove having a generally trapezoidal cross-section, but is not necessarily limited thereto. Alternatively, non-magnetic feature 70 may comprise, for example, a non-magnetic ring or slot disposed substantially or completely through the corresponding input or output member 64, 66. Moreover, non-magnetic feature 70 may be disposed on a surface of input or output member 64 or 66, or, may be disposed substantially or completely through input and output members 64, 66. The number of magnetic features 70 included in input and output members 64, 66 may depend on, for example, the torque transferring requirements of clutch 56. In the embodiment illustrated in FIGS. 2-4, for example, input member 64 includes a single non-magnetic feature 70. In the embodiment shown in FIG. 6 by comparison, output member 66 includes a plurality of non-magnetic features 70b located radially outwardly of a point equidistantly between non-magnetic features 70a in input member 64.

Figure 5A:
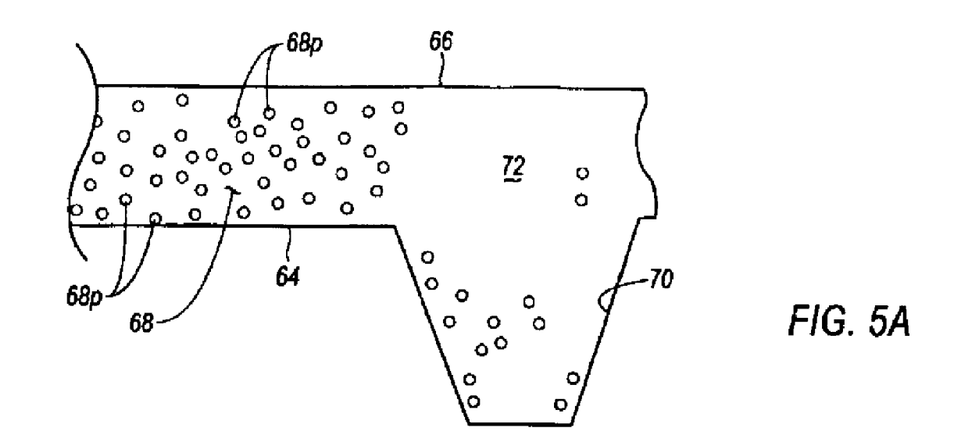
FIGS. 5A and 5B are schematic illustrations of a medium during disengagement and engagement, respectively, of the variable-engagement clutch shown in FIGS. 2-4.
Figure 5B:
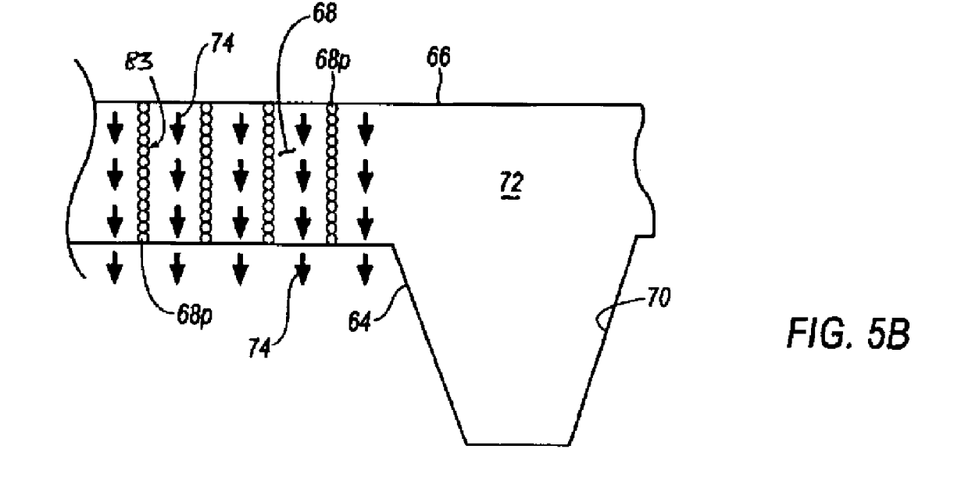

Input member 64 and output member 66 are not in contact, and may define therebetween a substantially uniform gap 72. Gap 72 should be wide enough to permit a thin layer of medium 68 (see, e.g., FIG. 5A), such as a magnetically reactive powder (e.g., iron powder), to reside between input and output members 64, 66. As shown in FIGS. 5A and 5B, the non-magnetic properties of features 70 aid in concentrating and directing lines of magnetic flux 74 across gap 72.

Variable-engagement clutch 56 also includes a source of magnetic flux 76, which may include, for example, an electromagnet mounted on the outside of support 62 between input member 64 and support 62. In the illustrated embodiment, source 76 includes a wire-wound coil 78 surrounded by a generally toroidal shell 80. As is well known, an electrical current applied to coil 78 can generate a magnetic field in the vicinity of source 76, the intensity of which is proportional to the level of current provided. Alternatively, source 76 may comprise other arrangements, including, for example, a permanent magnet supplemented by a counteracting electromagnet so that clutch 56 will default to being engaged should the electromagnet fail.

It is well known that lines of magnetic flux 74 travel a path substantially through structures with known magnetic properties. As illustrated in FIG. 4, lines of magnetic flux 74 exit rigid shell 80 into input member 64, whereby flux 74 saturates input member 64. Upon saturation, lines of magnetic flux 74 follow a path of least resistance and traverse gap 72 into output member 66. The narrowest width of features 70 is best designed to be greater than the width of gap 72, thus preventing flux 74 from traversing features 70 and short-circuiting medium 68. Upon entry into output member 66, flux 74 saturates output member 66 and then re-traverses gap 72 into input member 64. In the embodiment shown in FIG. 6, this process is repeated to weave flux 74 across gap 72 between features 70a and 70b until the number of non-magnetic features is exhausted.

As shown in FIG. 5B, magnetically reactive particles 68p can change formation in relation to the intensity of the magnetic field, for example, by aligning with lines of magnetic flux 74 as flux 74 traverses gap 72. Magnetically reactive particles 68p under the influence of a magnetic field can link or lock into chains 83, increasing the shear force and creating a mechanical friction against the surfaces of input and output members 64, 66 facing gap 72. The increased shear and friction result in a transfer of torque between input member 64 and output member 66.

In an embodiment, differential assembly 22 may also include a control system having a pressure sensor 82 for monitoring the hydraulic fluid pressure generated by hydraulic pump 54 and a controller 84, such as an microprocessor-based electronic control unit (ECU), adapted to vary the electric current supplied to variable-engagement clutch 56 to control the degree of hydraulic clutch 44 engagement in response to the hydraulic fluid pressure generated by hydraulic pump 54, such as in a closed-loop fashion. Controller 84 may include sufficient memory to store logic rules, generally in the form of a computer program, for controlling operation of variable-engagement clutch 56 and may be adapted to receive one or more inputs from various vehicle sources, such as a speed sensor, steering sensor, torque sensor or other vehicle controller, to determine when to activate clutch 56. It will be appreciated by those skilled in the art that the present invention is not limited to any particular type or configuration of ECU or to any specific control logic. Additionally, controller 84 may be integrated into differential assembly 22 and adapted to receive information from a vehicle communication bus, or may be contained in one or more vehicle controllers, such as the main vehicle ECU.

When it is desired to operate hydraulic clutch 44 by engaging variable-engagement clutch 56, an appropriate electrical signal can be transmitted to source of magnetic flux 76 to create a magnetic field, which as described above, can alter the properties of medium 68 to cause a transfer of torque between input member 64 and output member 66. In an embodiment, variable-engagement clutch 56 exhibits a nearly linear relationship between its output torque and the current applied to source 76, up to the magnetic saturation point of clutch 56. Accordingly, the amount of torque transferred between input and output members 64, 66 may be selectively controlled by varying the current applied to source 76, such that a partial engagement may be achieved when it is desirable, or a full engagement may be achieved when it is needed and acceptable. For example, when only minimal torque transfer between outputs 28 and 30 is desired, variable-engagement clutch 56 may be partially engaged, whereas when full axle lock is desired, variable-engagement clutch 56 may be fully engaged. Gradual engagement of variable-engagement clutch 56 also eliminates or reduces vehicle lurch caused by conventional limited-slip differentials having an output-locking clutch that engages in a virtual ON/OFF manner.

The input current to operate variable-engagement clutch 56 may be applied in two parts: (i) an engagement current required to fully engage the variable-engagement clutch 56; and (ii) a steady state current representing a predetermined current required to maintain variable-engagement clutch 56 fully engaged. An unlimited number of strategies for controlling engagement of variable-engagement clutch 56 may be generated, for example, by varying at least one of: (i) the level of engagement current; (ii) the rate of application of engagement current; and (iii) the rate of reduction of engagement current. The greater the magnitude and application rate of engagement current, the faster the engagement of variable-engagement clutch 56. As previously described, the engagement of variable-engagement clutch 56 is, at least in part, a function of the strength of the magnetic field generated by the source of magnetic flux 74, which in turn is related to the electric current applied to coil 78. When relatively fast engagement of variable-engagement clutch 56 is desired, the engagement current may be higher than the steady state current to overcome the inertial effects of the rotating input and output members 64, 66 coming up to speed. When a relatively slow engagement of variable-engagement clutch 56 is desired, the engagement current may be slowly ramped toward the steady state current.

The application of input current to source 76 may also be accomplished by pulse width modulating (PWM) the electrical signal provided by controller 84. According to this method, an electrical signal having a predetermined current, for example the current corresponding to the magnetic saturation point of variable-engagement clutch 56, is pulsed at a predetermined frequency, which results in a lower overall mean input current being applied to source 78. For example, without limitation, an electrical signal with a current value of 6 amps could be pulsed 50% of the time resulting in approximately one-half of the input power associated with 6 amps being applied to source 76. As will be appreciated, pulse width modulating the engagement current may reduce the maximum power input to source 76 resulting in a more efficient operation of variable-engagement clutch 56.

Because of the potentially linear (or substantially linear) relationship between the application of current and output torque of variable-engagement clutch 56, it is possible to apply an input current to source 76 that permits the output member 66 to slip relative to input member 64 resulting in clutch 56 being only partially engaged. When partially engaged, a lesser amount of torque is transferred from input member 64 to output member 66 than would be transferred if variable-engagement clutch 56 were fully engaged. Thus, the resulting speed at which output member 66 drives pump, and accordingly the output pressure of pump 54, may be varied according to the input current provided to variable-engagement clutch 56.

As will also be appreciated, variable-engagement clutch 56 may be engaged to operate hydraulic pump 54 when there is substantially no difference in speed between outputs 28 and 30—a feature useful in vehicle stability control applications. For example, over-steer is a condition where a vehicle is making too tight of a turn for a given vehicle speed, which may result in the vehicle spinning out of control. During over-steer, the difference in speed between outputs 28, 30 is relatively low and is generally not indicative of a loss of traction in a drive wheel. Engagement of variable-engagement clutch 56 allows the vehicle to lock rotation of outputs 28, 30, which effectively speeds up the inner drive wheel to correct the over-steer condition.

Figure 7:
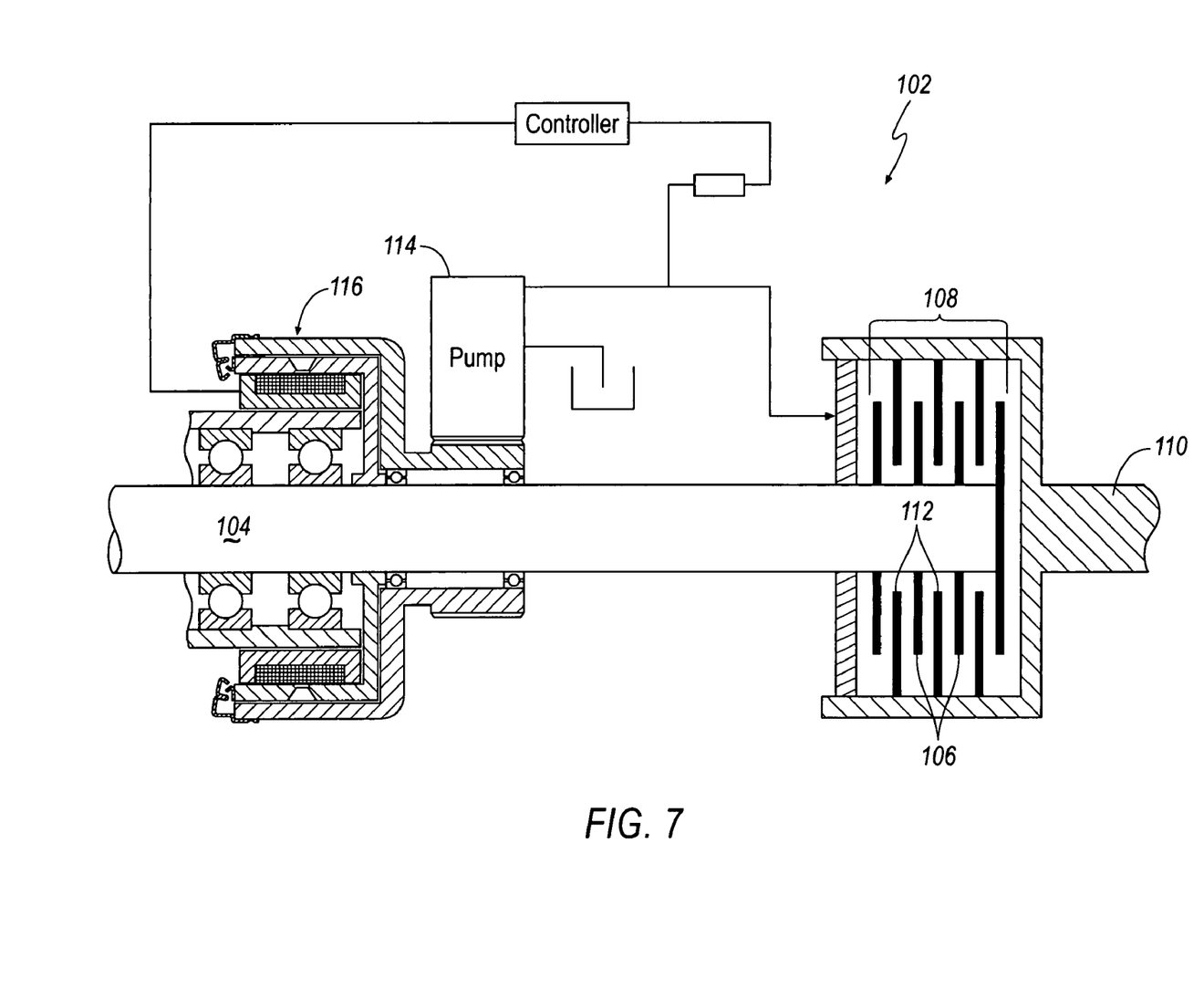
FIG. 7 is a schematic illustration of a torque coupling according to an embodiment of the present invention.

Referring to FIG. 7, a cross-sectional view of a torque coupling 102 according to an embodiment of the present invention is shown. In the illustrated embodiment, torque coupling 102 is substantially similar to differential assembly 22 in both structure and operation with at least one exception, namely, torque coupling 102 does not include a differential component 24. Instead, an input 104 is operatively connected to at least one friction disk 106 of a multi-disk clutch pack 108 and an output 110 is operatively connected to at least one friction disk 112. Operation of torque coupling 102 is substantially similar to operation of differential assembly 22 in that a hydraulic pump 114 is driven by a variable-engagement clutch 116 operatively connected to input 104 such that input 104 selectively and variably drives hydraulic pump 114 during engagement of variable-engagement clutch 116 to selectively compress clutch pack 108 and transfer torque between input 104 and output 110.

Referring to FIGS. 8A-8D, a cross-sectional view of a vehicle differential assembly 200 is shown according to an embodiment of the present invention. The differential assembly 200 includes a hydraulically-assisted, electronically-controlled, limited-slip differential that is capable of providing variable torque distribution between a pair of outputs 202, 204 driven by input 26. The outputs 202, 204 may also be referred to as half-shafts. Accordingly, the half-shafts 202, 204, if desired, can range, in operation, from a default, full-slip mode to a full-lock mode. Differential 200 may be provided as a stand-alone assembly or, instead, if desired, may be integrated with another vehicle system, such as a vehicle's ABS or stability control package, to provide enhanced vehicle dynamics.

According to an embodiment of the invention, the vehicle differential assembly 200 may generally operate in a similar manner as described in connection with FIGS. 1-7, which include the following elements: input 26, hydraulic pump 54, variable-engagement clutch 56, sump 58, bearings 60, cylindrical support 62, input member 64, output member 66, short-circuiting medium 68, non-magnetic feature(s) 70, gap 72, magnetic flux 74, source of magnetic flux 76, wire-wound coil 78, and controller 84. The variable engagement clutch 56, may be, for example, a magnetic particle clutch, which engages the hydraulic pump 54 to the input shaft 26 or a gear, such as, for example, a spur gear 79, connected to the input shaft 26. Torque transmitted by the magnetic particle clutch 56 can be proportional to electrical current provided to the magnetic particle clutch 56.

The vehicle differential assembly 200 is also shown to include a valve, which is shown generally at 75. Illustrated valve 75 is in fluid communication with hydraulic pump 54, sump 58, and hydraulically-actuated clutches, which are shown generally at 44a, 44b and are associated with half shafts 202, 204, respectively. The valve 75 may also include an actuator 77 that may receive commands from controller 84 to direct fluid pressure to either one or both of the hydraulically-actuated clutches 44a, 44b. When the variable engagement clutch 56 is not energized, essentially no fluid will be pumped to the one or more hydraulically-actuated clutches 44a, 44b. According to an embodiment, the valve 75 may include, for example, a spring-centered valve, such as, for instance, a servo valve. According to an embodiment, the actuator 77 may include, for example, a single- or dual-coil solenoid.

The hydraulically-actuated clutches 44a, 44b, which are shown schematically for purpose of illustration, each respectively include a multi-disk clutch pack 46a, 46b and a clutch pack-compressing actuator 48a, 48b (e.g., a piston) that is movable in response to application of hydraulic fluid pressure from the hydraulic pump 54. An embodiment of the illustrated hydraulically-actuated clutches 44a, 44b is generically shown in FIGS. 8A-8D and provided by way of reference. It will be appreciated that other fluid power assisted clutch configurations that selectively and variably couple rotation of the half shafts 202, 204 relative the drive wheel 16a, 16b may be employed in alternate configurations without departing from the scope of the present invention. For example, hydraulically-actuated clutches 44a, 44b may comprise any type of axially-actuated clutch, such as, for example and without limitation, a single disk clutch, a multi-disk clutch or a cone clutch. A square jaw clutch or a spiral jaw clutch may also be used; however, these clutches do not necessarily proportionally transmit torque.

In the illustrated embodiment, each hydraulically-actuated clutch 44a, 44b includes at least one first friction disk 50a, 50b connected for rotation with an outer surface 206a, 206b of the half shafts 202, 204 and at least one second friction disk 52a, 52b connected for rotation with a differential housing 208a, 208b respectively. Each differential housing 208a, 208b is respectively encompassed by and rotatably driven by gears 210a, 210b. The gears 210a, 210b are driven by rotation of a lay-shaft 212 including a pinion gear 214. The pinion gear 214 of the lay-shaft 212 is rotatably-driven by the ring gear 38 of the gear assembly 32.

When the vehicle 10 is driven, output of the hydraulic pump 54 may be selectively directed by valve 75 to the hydraulically-actuated clutches 44a, 44b according to commands received at the actuator 77 from the controller 84. For example, controller 84 may direct the actuator 77 to cause the valve 75 to direct output of the hydraulic pump 54 to (a) the first hydraulically-actuated clutch 44a, (b) the second hydraulically-actuated clutch 44b, or (c) both hydraulically-actuated clutches 44a, 44b. The controller may also de-energize the variable clutch 54 such that the pump 54 will not output fluid. For example, the above-described output of the hydraulic pump 54 may be represented by various combinations of an "X/Y position" signal sent from the controller 84 to the actuator 77 to vary fluid pressure applied to the clutch pack-actuators 48a, 48b. For example, the variable "X" may be related to the application of torque to the drive wheel 16a arising from movement of the first clutch pack-actuator 48a, and, the variable "Y" may be related to the application of torque to the drive wheel 16b arising from movement of the second clutch pack-actuator 48b. In the following description, the "off" and "on" position signals may be substituted for either variable "X" or "Y" to show no application of fluid pressure, or, an application of fluid pressure to the clutch pack-actuators 48a, 48b. Although the following description only shows the terms "off" and "on," it will be appreciated that the fluid pressure applied to the clutch pack-actuators 48a, 48b need not be all or nothing; rather, it may vary in a functional manner so as to selectively control a desired amount of fluid pressure supplied to the hydraulically-actuated clutches 44a, 44b.

Figure 8A:
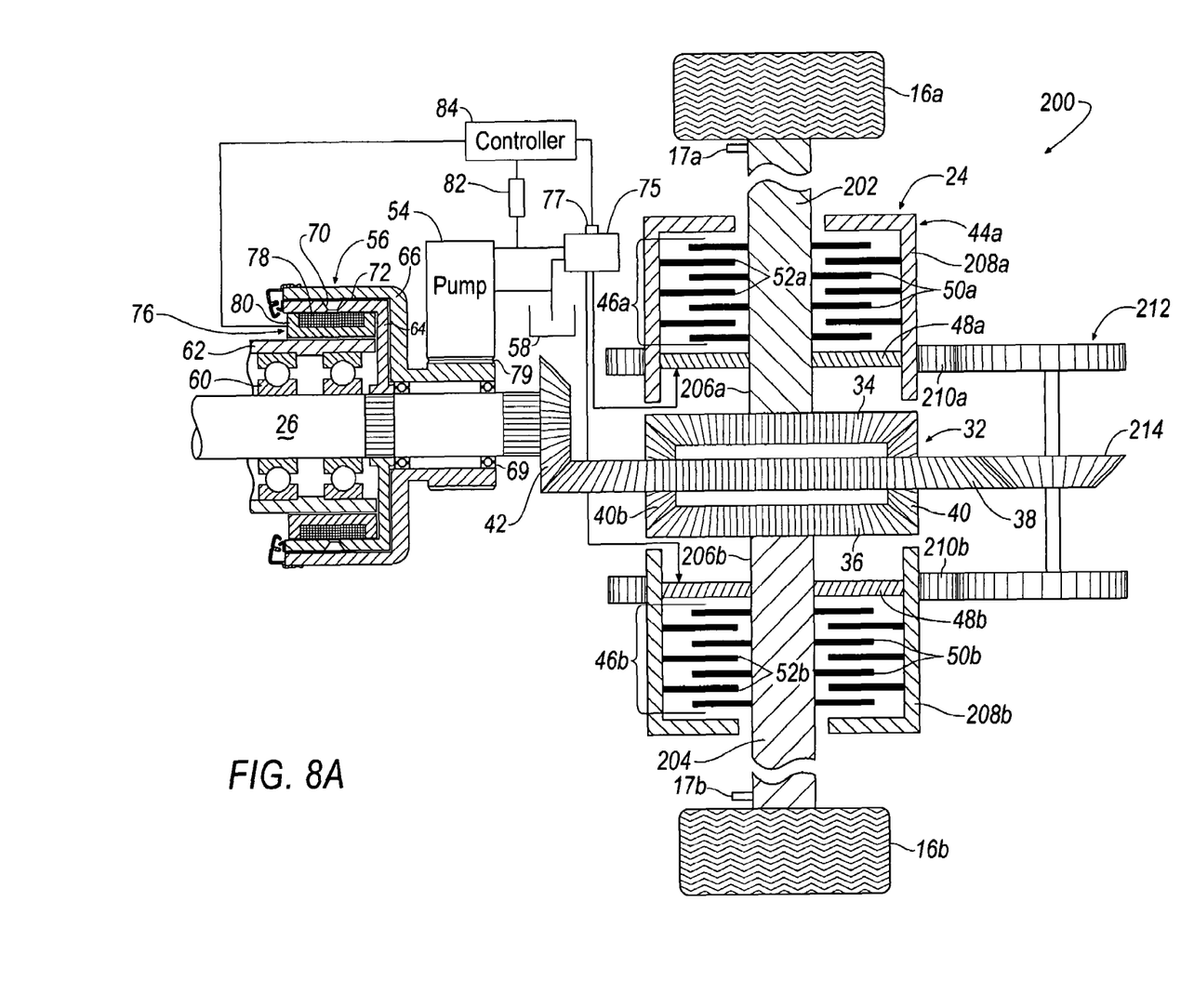
FIGS. 8A-8D are schematic illustrations of a differential assembly according to an embodiment of the invention.

In the embodiment illustrated in FIG. 8A (which may be referred to as a "default state"), controller 84 is not sending current to the variable clutch 56. As a result, fluid is not pumped and no direct torque is applied to each drive wheel 16a, 16b. Accordingly, when the valve 75 is in a default state, each hydraulically-actuated clutch 44a, 44b is in a substantially open state, permitting full (or substantially full) slip of each half-shaft 202, 204 during operation of the vehicle 10. In this mode, the differential may function as a standard open differential.

Figure 8B:
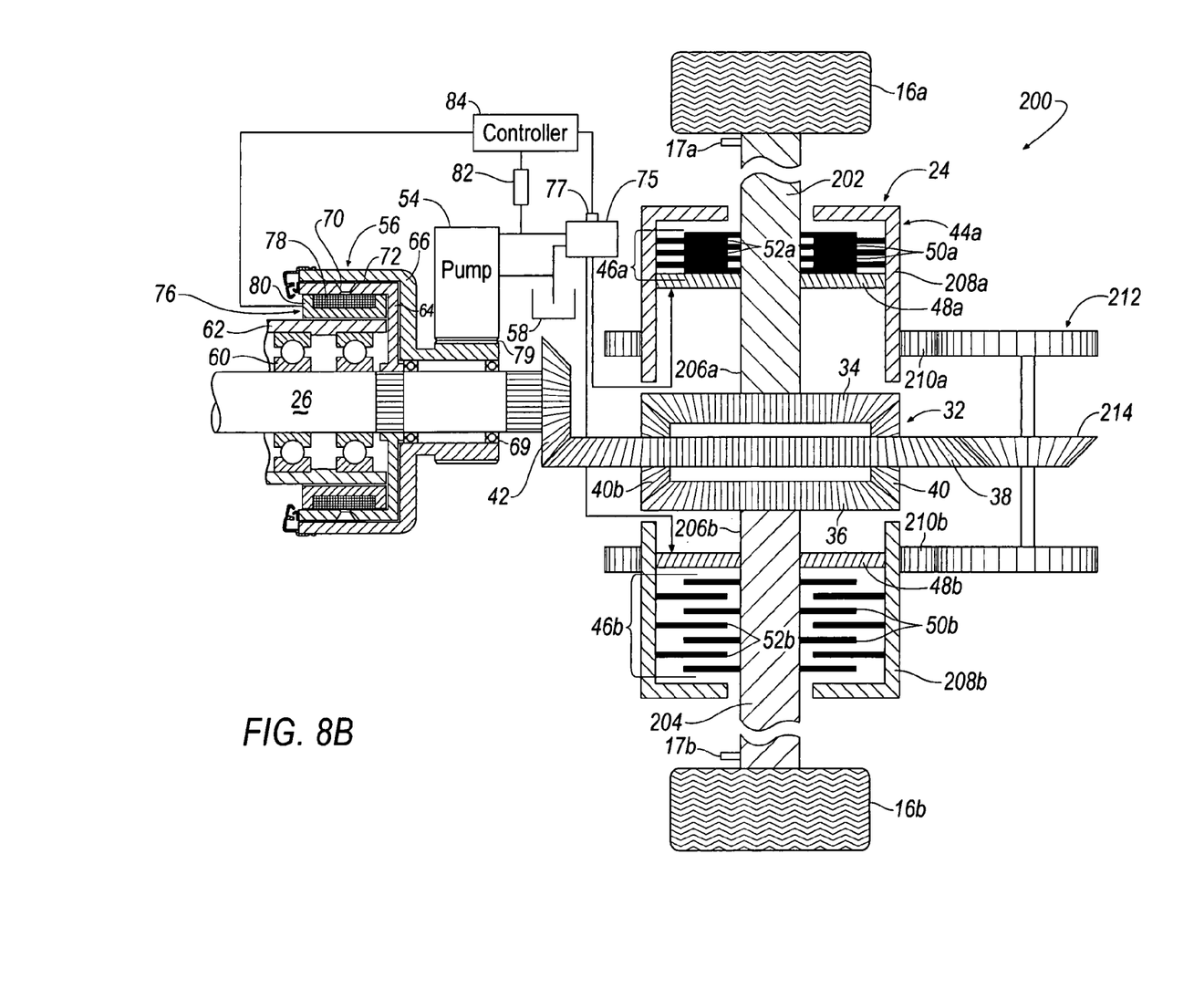

As illustrated in the embodiment of FIG. 8B, an "on/off position" signal may be sent from the controller 84 to variable clutch 56 and actuator 77. The variable clutch 56 is shown engaged and the pump 54 is pumping in this position. The "on/off position" signal moves the valve 75 to or into a state such that fluid output is directed from the hydraulic pump 54 to first clutch pack-compressing actuator 48a, while blocking fluid output from the hydraulic pump 54 to second clutch pack-compressing actuator 48b. As a result, torque is applied to the drive wheel 16a while no torque is applied to the drive wheel 16b. Accordingly, the first hydraulically-actuated clutch 44a is moved to a closed state and may at least partially (or even fully) lock rotation of half shaft 202 with the drive wheel 16a while allowing slip of the half shaft 204 and respective drive wheel 16b during operation of the vehicle 10.

Figure 8C:
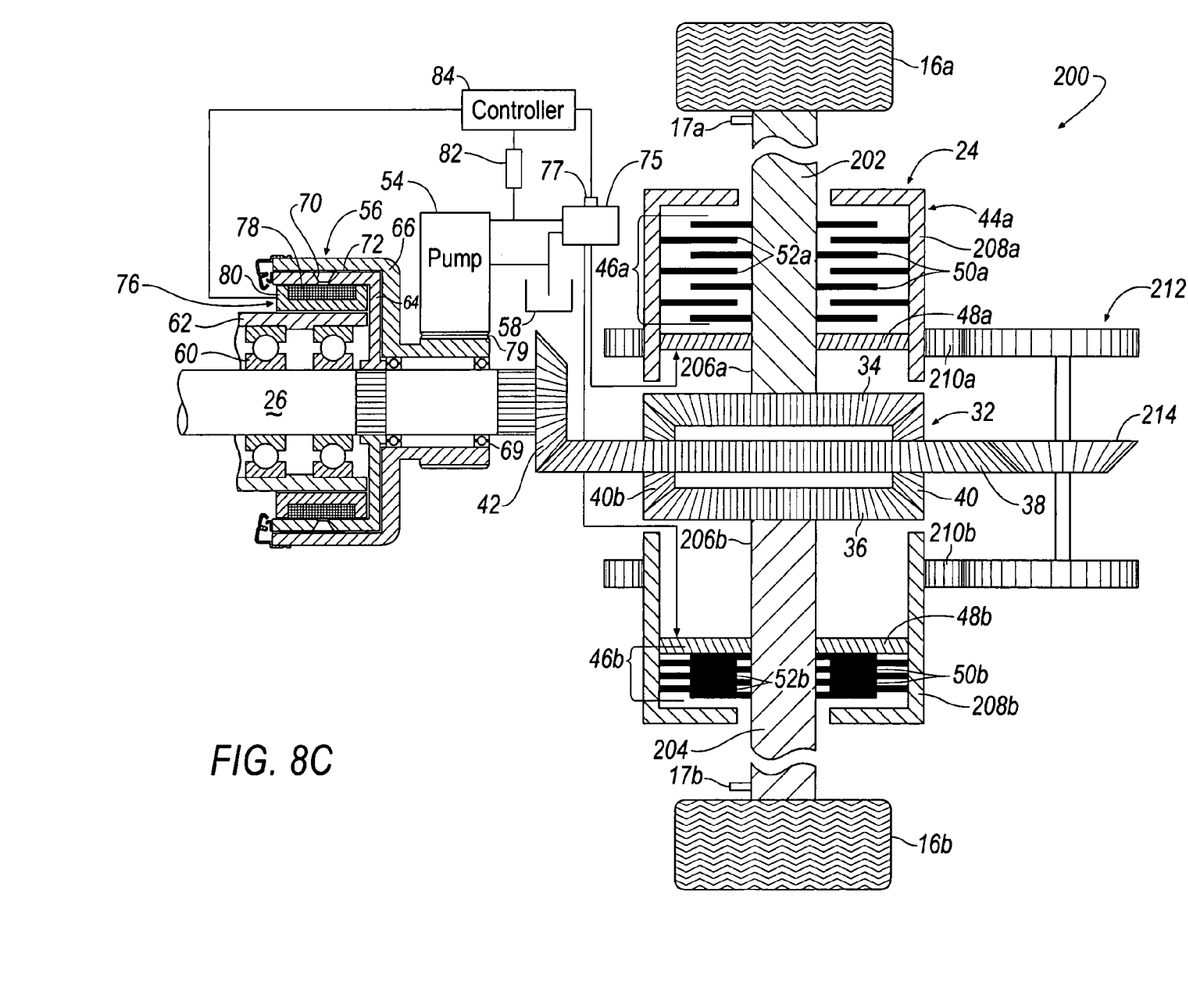

As illustrated in the embodiment of FIG. 8C, an "off/on position" signal is sent from the controller 84 to variable clutch 56 and to the actuator 77. The variable clutch 56 is shown engaged and the pump 54 is pumping in this position. The "off/on position" signal moves the valve 75 to or into a state such that fluid output is directed from the hydraulic pump 54 to the second clutch pack-compressing actuator 48b, while impeding or blocking fluid output from the hydraulic pump 54 to the first clutch pack-compressing actuator 48a. As a result, torque may be applied to the drive wheel 16b while no torque may be applied to the drive wheel 16a. Accordingly, the first hydraulically-actuated clutch 44b is moved to a closed state and may at least partially or fully lock rotation of half shaft 204 with the drive wheel 16b while allowing slip of the half shaft 202 and respective drive wheel 16a during operation of the vehicle 10.

Figure 8D:
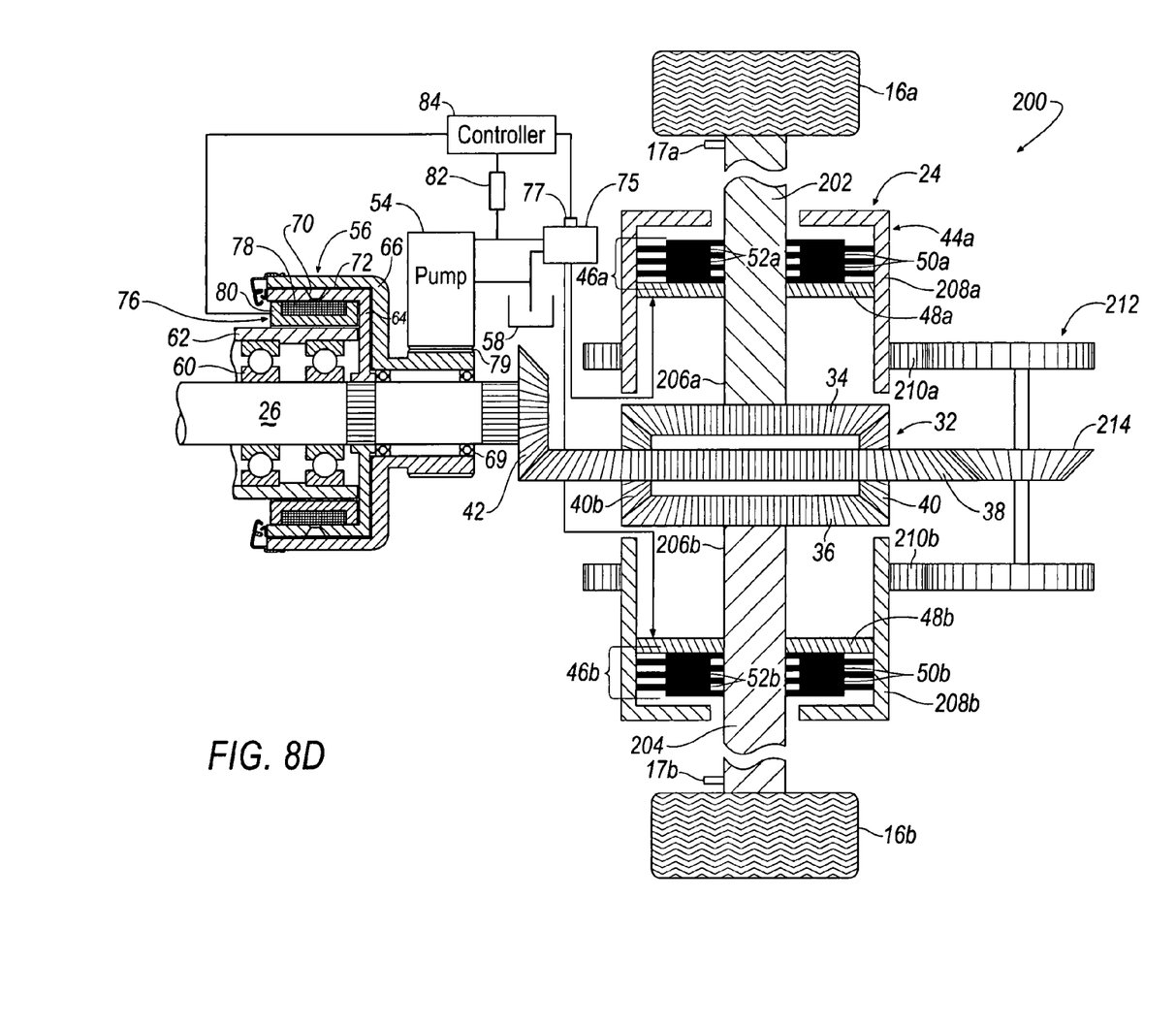

As illustrated in the embodiment of FIG. 8D, an "on/on position" signal is sent from the controller 84 to variable clutch 56 and to the actuator 77. The variable clutch 56 is shown engaged and the pump 54 is pumping in this position. The "on/on position" signal moves the valve 75 to or into a state that directs fluid output from the hydraulic pump 54 to both clutch pack-compressing actuators 48a, 48b. As a result, each hydraulically-actuated clutch 44a, 44b is in a closed state to partially or fully lock both half-shafts 202, 204 and respective drive wheels 16a, 16b during operation of the vehicle 10.

Figure 9:
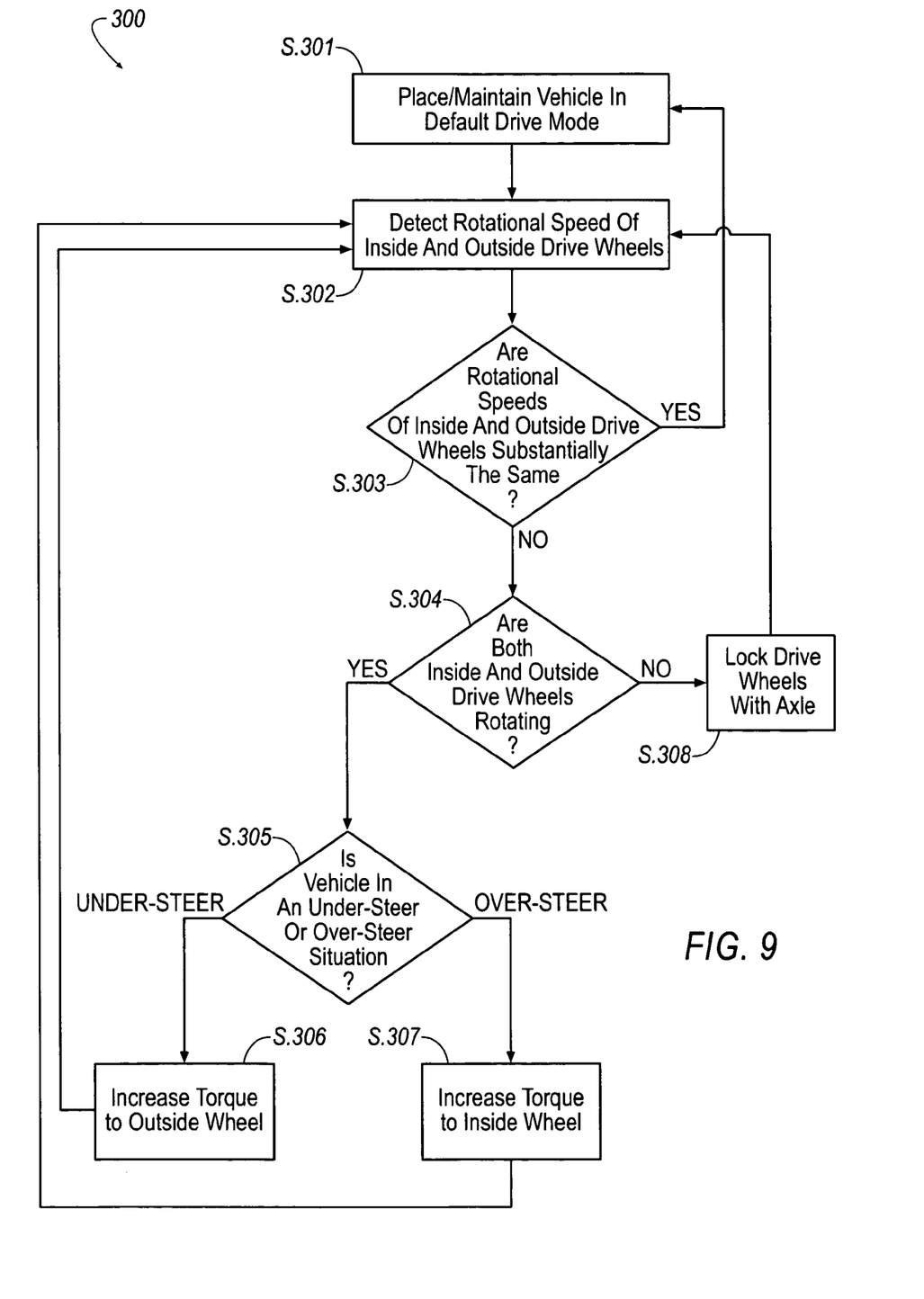
FIG. 9 generally illustrates a logic diagram for vectoring torque to control the stability of a vehicle according to an embodiment of the present invention.

By providing such an arrangement of the valve 75 and actuator 77 with a differential assembly 200, a vehicle 10 may have improved torque vectoring capabilities, thereby, among other things, improving the stability control of a vehicle 10. Referring to FIG. 9, an embodiment of a method for controlling the vehicle 10 having torque vectoring capabilities is generally shown (and is labeled 300). Torque vectoring generally relates to the control of the rotational speed of inside or outside drive wheels. For example, vectoring torque to: (a) one or both inside drive wheels, or (b) one or both outside drive wheels, can correct, respectively, an over-steer or under-steer condition of a vehicle 10. Differences in rotational speed of drive wheels can typically occur when a vehicle enters a turn (e.g. the vehicle generally deviates from a forward movement to a lateral movement). Although the above-described embodiment in FIGS. 8A-8D only illustrate one outside drive wheel 16a and one inside drive wheel 16b, it will be appreciated that control of two or more outside and inside drive wheels 16, 18 may be accomplished with a transfer case 19, such as generally described above.

When considering the description of FIGS. 8A-8D in view of the description associated with FIG. 9, the drive wheel 16a may be referred to as an "outside wheel" and the drive wheel 16b may be referred to as an "inside wheel." As seen at step S.301, the vehicle 10 may be initially placed/maintained in a default drive mode when no fluid pressure is applied to either hydraulically-actuated clutch 44a, 44b. Then, at step S.302, rotational speed of the outside drive wheel 16a and the inside drive wheel 16b is sensed or detected by, for example, wheel speed sensors 17a, 17b (FIGS. 8A-8D), respectively. At step S.303, the rotational speed of each drive wheel 16a, 16b is compared to determine if the rotational speeds are substantially the same (or within a specified difference). If the rotational speeds of the drive wheels 16a, 16b are substantially the same at step S.303, step S.303 is returned to step S.301.

However, if the rotational speeds of the drive wheels 16a, 16b are determined to not be substantially the same (or within a specified difference) at step S.303, step S.303 is advanced to step S.304 where it is determined if both drive wheels 16a, 16b are rotating. At step S.304, if it is determined that both drive wheels 16a, 16b are rotating, but at different speeds, step S.304 is advanced to step S.305; conversely, if it is determined that both drive wheels 16a, 16b are not rotating, step S.304 is advanced to step S.308.

A difference in wheel speed is commonly experienced when a vehicle is entering a turn. When in a turn, the inside wheels 16b travel rotate slower (i.e., travel on a smaller arc or circle) than the outside wheels 16a. Accordingly, the speed of the wheels 16a, 16b provide information regarding the difference of circle diameter that the wheels 16a, 16b are traveling on. When the diameters are compared with an angle of the steering wheel, slip angles for the front wheels and rear wheels are computed, for example, by the controller 84. If the slip angles are equal, the vehicle 10 is in a neutral steering state and no correction is required. However, if, the slip angle of the front wheels exceeds that of the rear wheels, the vehicle 10 is under-steering and more torque may need to be sent to the outside wheels 16a. Conversely, if the slip angle of the rear wheels exceeds that of the front wheels, the vehicle 10 is over-steering and more torque may need to be sent to the inside wheels 16b.

Accordingly, at step S.305, it is determined if the vehicle 10 is in an under-steer or over-steer situation. If the vehicle 10 is in an under-steer situation, step S.305 is advanced to step S.306 where the valve 75 directs fluid pressure to the hydraulically-actuated clutch 44a to increase torque to the outside drive wheel 16a. Step S.306 is then advanced to step S.302 to reassess the rotational speed of the wheels in the form of a feedback control loop and the cycle can be generally repeated.

If, at step S.305, it is determined that the vehicle 10 is in an over-steer situation, step S.305 is advanced to step S.307. At step S.307, the valve 75 directs fluid-pressure to the hydraulically-actuate clutch 44b to increase torque to the inside drive wheel 16b. Step S.307 is then advanced to step S.302 to reassess the rotational speed of the wheels in the form of a feedback control loop and the cycle can be generally repeated.

If a method, such as discussed in connection with FIG. 9, is advanced to a step such as S.308, the controller 84 may, for example, have determined (e.g., from one of the wheel speed sensors 17a, 17b) that one of the drive wheels 16a, 16b is not rotating. When such a condition occurs, the controller 84 can be configured to instruct the valve 75 (e.g., at step S.308) to direct fluid pressure to both hydraulically-actuated clutches 44a, 44b to lock (or substantially lock) rotation of the half-shafts 202, 204 so that rotation of both drive-wheels 16a, 16b become substantially the same. Step S.308 can then be advanced to step S.302 to generally repeat the cycle as noted above.

The method, as generally shown at 300, may be a program that is stored in the controller 84. Accordingly, as described above, the wheel speed sensors 17a, 17b may provide yet another input to the controller 84 that works in cooperation with the hydraulic pump 54, variable-engagement clutch 56, pressure sensor 82, and valve 75 to control torque vectoring to the drive wheels 16a, 16b. Superior stability of the vehicle 10 is thereby obtained by applying the method 300.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicle differential assembly comprising:
a differential driven by an input and adapted to allow differing rotational speed between a pair of outputs, the differential including a gear assembly connected to the outputs and one or more hydraulically-actuated clutches for selectively and variably coupling the outputs;
a hydraulic pump adapted to generate hydraulic fluid pressure for engagement of the one or more hydraulically-actuated clutches;
a variable-engagement clutch operatively connected to the input and the hydraulic pump such that the input selectively drives the hydraulic pump during engagement of the variable-engagement clutch to provide hydraulic fluid pressure to the one or more hydraulically-actuated clutches; and
a valve operatively connected to the hydraulic pump and the one or more hydraulically-actuated clutches to selectively or variably provide fluid pressure from the hydraulic pump to the one or more hydraulically-actuated clutches.

2. The differential assembly of claim 1, wherein the variable-engagement clutch comprises a magnetic particle clutch.

3. The differential assembly of claim 1, wherein the hydraulic pump is a gerotor pump.

4. The differential assembly of claim 1, wherein the one or more hydraulically-actuated clutches each include a multi-disk clutch pack and a clutch pack-compressing actuator that is movable in response to application of hydraulic fluid pressure.

5. The differential assembly of claim 1, further including a housing that surrounds the differential, the hydraulic pump, and the variable-engagement clutch; the housing including a sump from which the hydraulic pump draws hydraulic fluid for pressurization and transfer to the hydraulically-actuated clutch.

6. The differential assembly of claim 1, wherein the variable-engagement clutch includes a rotatable input member operatively connected to the input, a rotatable output member operatively connected to the hydraulic pump, and a medium disposed between the input and output members.

7. The differential assembly of claim 6, wherein the medium is a magneto-restrictive fluid.

8. The differential assembly of claim 6, wherein the medium is an electro-restrictive fluid.

9. The differential assembly of claim 6, wherein at least one of the input member and the output member include a non-magnetic feature.

10. The differential assembly of claim 1, further including a control system having a pressure sensor for monitoring the hydraulic fluid pressure generated by the hydraulic pump and a controller adapted to control the degree of engagement of the variable-engagement clutch in response to the hydraulic fluid pressure generated by the hydraulic pump.

11. The differential assembly of claim 10, wherein the controller is adapted to vary electric current supplied to the variable-engagement clutch to control the degree of clutch engagement of the variable-engagement clutch.

12. The differential assembly of claim 10, wherein the controller is adapted to send a control signal to an actuator operatively connected to the valve for directing fluid pressure to neither, one of, or both hydraulically-actuated clutches.

13. The differential assembly of claim 1, wherein the gear assembly includes a ring gear having a pair of pinion gears that mesh with a pair of side gears, wherein each side gear is secured to a corresponding one of the outputs that respectively support differential housings including the hydraulically-actuated clutches, and wherein the input includes a pinion shaft having a pinion gear that meshes with the ring gear.

14. The differential assembly of claim 13, wherein the one or more hydraulically-actuated clutches each include a clutch pack having at least one first friction member connected for rotation with one of the outputs and at least one second friction member connected for rotation with each differential housing.

15. The differential assembly of claim 13, wherein each differential housing is respectively substantially encompassed by and rotatably driven by a gear that is driven by rotation of a lay-shaft including a lay-shaft pinion gear that is rotatably-driven by the ring gear.

* * * * *